United States Patent [19]

Takagi

[11] Patent Number: 5,283,776
[45] Date of Patent: Feb. 1, 1994

[54] TRACK-COUNTING METHOD FOR USE IN OPTICAL DISK APPARATUS

[75] Inventor: Genzo Takagi, Urawa, Japan

[73] Assignee: Matsushita Graphic Communication Systems, Inc., Tokyo, Japan

[21] Appl. No.: 706,705

[22] Filed: May 29, 1991

[30] Foreign Application Priority Data

May 29, 1990 [JP] Japan .................. 2-141137

[51] Int. Cl.$^5$ .............................................. G11B 7/00
[52] U.S. Cl. .............................. 369/58; 369/50; 369/44.28; 369/32; 369/54; 360/78.14
[58] Field of Search ............... 369/32, 44.11, 50, 58, 369/48, 54, 44.26, 44.27, 44.28, 44.29; 360/78.14, 77.01

[56] References Cited

U.S. PATENT DOCUMENTS

| | | | |
|---|---|---|---|
| 4,868,819 | 9/1989 | Kimura | 369/32 |
| 4,896,240 | 1/1990 | Moriya et al. | 360/78.14 |
| 4,918,676 | 4/1990 | Miyasaka | 369/32 |

FOREIGN PATENT DOCUMENTS 1-138621 5/1989 Japan .

Primary Examiner—Aristotelis Psitos
Assistant Examiner—Nabil Hindi
Attorney, Agent, or Firm—Lowe, Price, LeBlanc & Becker

[57] ABSTRACT

A method of counting the number of tracks on an optical disk each track comprising a plurality of sectors each having an address segment and a plurality of data segments, each of the segments having at its head portion a region for recording an access code representing a track number to which the segment belongs. The method comprises the steps of sampling the access code number through an optical head, obtaining a code number difference (V0) between the present sampled access code number (GC) and the previous sampled access code number (GC1), and adding the code number difference to a track count value (TCNT) to obtain the number of the tracks that the optical head moves to traverse. This method can accurately and surely count the number of the tracks of an optical disk.

12 Claims, 6 Drawing Sheets

TRACK-COUNTING METHOD FOR USE IN OPTICAL DISK APPARATUS

BACKGROUND OF THE INVENTION

The present invention relates to a method and system for counting tracks of an optical disk, and more particularly to a track-counting method and system for use in sample servo type optical disk apparatus.

As one of tracking systems for the write-once type optical disk there is known the sample servo system as exemplified in FIG. 1. In FIG. 1, illustrated at numeral 1 is an optical disk having a number of data-recording tracks TR coaxially formed thereon. For access of an optical head 2 to a destination track (recording track with a predetermined address), an optical head drive section 4 is driven in accordance with a drive signal from a drive control section 3 to be moved radially with respect to the optical disk 1 so that the optical head 2 traverses the recording tracks one by one. The optical disk 1 rotates during this head-traversing operation whereby the optical head 2 picks up data from the optical disk 1 to output the pickup signal. A signal processing circuit 5 processes the pickup signal to obtain tracking information periodically outputted whenever the optical head 2 traverses each recording track TR, the tracking information being counted by a track-counting section 6 so as to count the number of the tracks TR. FIG. 2 is an illustration of a sample servo type disk recording system for describing the above-mentioned pickup signal. In FIG. 2, the recording area includes a pit region for a servo byte and a data region for recording data. In the pit region there are a pair of tracking signal pits PA and PB provided at the positions offset by ¼ pitch toward the inner side and outer side with respect to the center line of each of the recording tracks $TR_{n+1}$, $TRn$, $TR_{n-1}$, and there is further a clocking signal pit PC provided on the center line of each track. The optical head 2 successively illuminates these pits PA, PB and PC and receives the reflection light therefrom to pick up information signals. The pickup signals are supplied to the signal processing circuit 5 so as to be sampled and held on the basis of sampling pulses generated at the timing of the detections of the pits PA, PB and PC, thereby detecting the tracking information representing the position-shifted amount of the read light beam of the optical head 2 from the tracking signal pits PA and PB and further detecting the clock information indicating the timing that the read light beam from the optical head 2 passes on the clocking signal pit PC.

Here, for the servo byte system indicated in the pit region of FIG. 2, there has been proposed an access code region as shown in FIG. 3. That is, the successively arranged tracks are grouped into units each comprising 16 tracks, i.e., 0th track to 15th tracks numbered in order, which are indicated with 4 pits provided on the track center line. The 4 pits are provided in a space for allowing the provision of 11 pits and, of the 4 pits, 3 pits are provided at the similar positions to 3 pits of the adjacent track and 1 pit is provided at the different position from 1 pit of the adjacent track. In this case, if the disk is eccentrically deformed, there is the possibility that the optical head moves in the direction opposite to the normally track-counting direction, thereby making it difficult to accurately count the number of the tracks.

SUMMARY OF THE INVENTION

It is therefore an object of the present invention to provide a tracking-counting system which is capable of accurately and surely counting the number of the tracks of an optical disk.

The present invention provides a method of counting the number of tracks on a disk each track comprising a plurality of sectors each having an address segment and a plurality of data segments, each of the segments having at its head portion a region for recording an access code representing a track number to which the segment belongs, the method comprising the steps of: sampling the access code number; obtaining a code number difference (V0) between the present sampled access code number (GC) and the previous sampled access code number (GC1); and adding the code number difference to a track count value (TCNT) to obtain the number of the tracks that a recording/reproducing head moves to traverse.

Preferably, the method further comprises the step of, in the case that difficulty is encountered to read out the access code number (GC) to be sampled presently, adding the previous code number difference (V1) to the track count value (TCNT) to obtain the number of the tracks that the recording/reproducing head moves to traverse, and, when the address segment is read during the track counting operation, setting the count number to a count number calculated on the basis of the address of the read address segment. Moreover, the tracks on the disk are grouped into a plurality of units each comprising a predetermined number of the tracks and the tracks of the units relatively corresponding to each other have the same track number, and the track count value is arranged to take a negative value so that the number of the tracks that said head moves is converged to 0.

In accordance with the present invention, there is further provided a method of counting the number of tracks on a disk each track comprising a plurality of sectors each having an address segment and a plurality of data segments, each of the segments having at its head portion a region for recording an access code representing a track number to which the segment belongs, the method comprising the steps of: sampling the access code number; obtain a code number difference (V0) between the present sampled access code number (GC) and the previous sampled access code number (GC1); calculating the absolute value of a variation of the present code number difference (V0) with respect to the previous code number difference (V1); and adding the present code number difference (V0) to the track count value (TCNT) when the absolute value of the variation is below a predetermined value (Amax) and adding the previous code number difference (V1) to the track count value (TCNT) when the absolute value thereof exceeds the predetermined value (Amax) to thereby obtain the number of the tracks that the recording/reproducing head moves to traverse.

According to this invention, there is still further provided a method of counting the number of tracks on a disk each track comprising a plurality of sectors each having an address segment and a plurality of data segments, each of the segments having at its head portion a region for recording an access code representing a track number to which the segment belongs, the method comprising the steps of: sampling the access code number; obtaining a code number difference (V0) between the present sampled access code number (GC) and the previous sampled access code number (GC1); calculating the absolute value of a variation of the present code number difference (V0) with respect to the previous code number difference (V1); adding the present code number difference (V0) to the track count value (TCNT) when the absolute value of the variation is below a predetermined value (Amax); and, when the absolute value of the variation exceeds the predetermined value (Amax), deciding that the track numbers are detected in a direction opposite to the direction to be counted so as to calculate the absolute value of a variation of the access code number difference in the opposite direction to obtain the number of the tracks, that the head traverses, on the basis of the calculated absolute value.

That is, for counting the number of the tracks, in the case that the track number becomes larger in the track-counting direction, the code number difference becomes a positive value to allow the counting of the inter-track number by the addition. Further, in the case that the track number decreases, although the code number difference assumes a negative value, it is also possible to count the number of the tracks. When the absolute value of the code number variation exceeds the predetermined value, under the consideration that the optical head relatively moves in the direction opposite to the track-counting direction, the count value of the tracks is arranged to be decreased. When the the absolute value of the code number difference variation is extremely large (or when the code number cannot be read), under the decision that an abnormality occurs, an estimation value (for example, the previous number difference) is used as the present code number difference for counting the number of the tracks. Here, when the address of the address segment can be read (decoded) during the track-counting operation, the calculation is effected by preferentially using the read address to count the number of the tracks on the basis of the calculation result.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
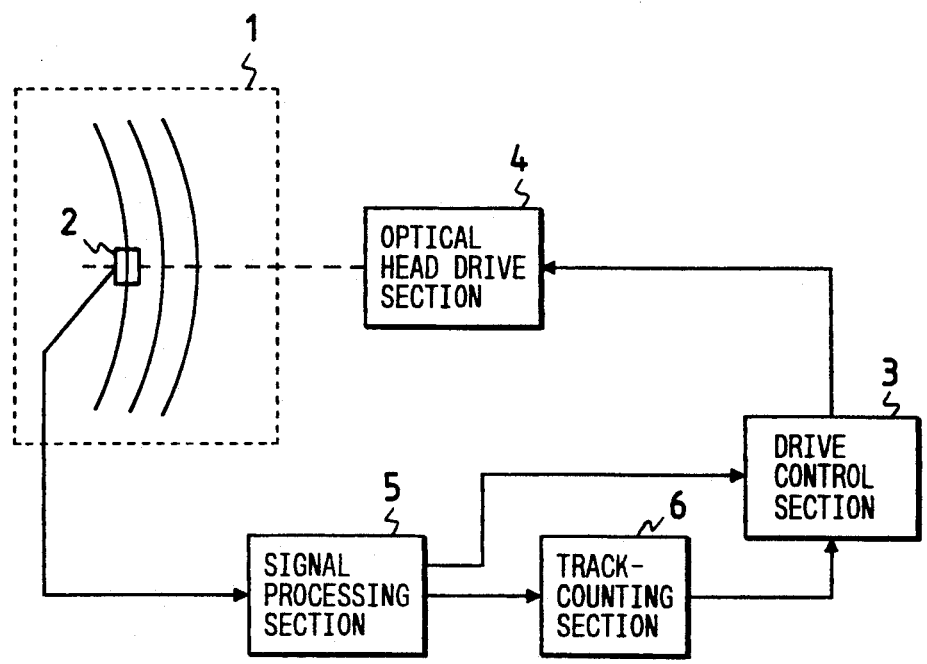
FIG. 1 is a block diagram showing an arrangement of a conventional track-counting system.
Figure 2:
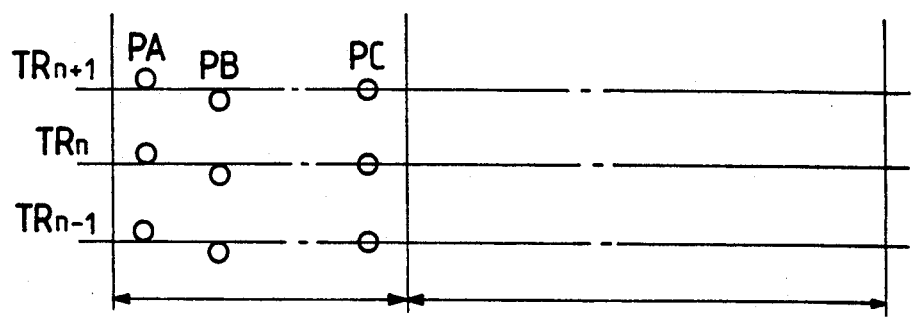
FIG. 2 is an illustration of a sample servo type recording format.
Figure 3:
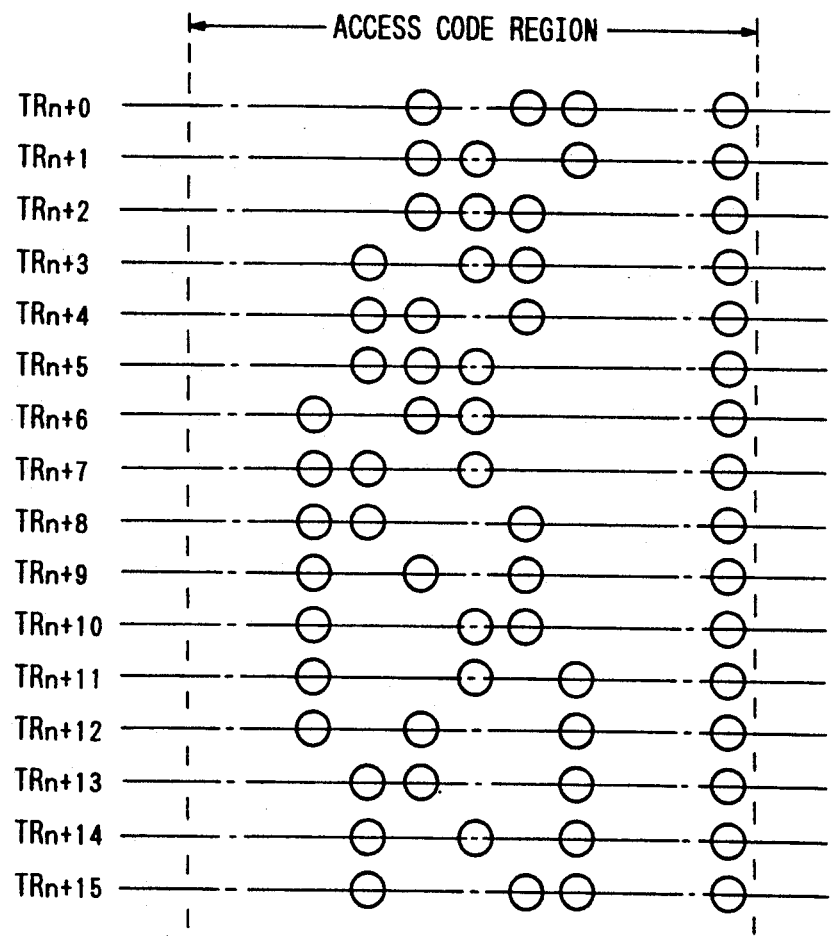
FIG. 3 is an illustration of access code in an access code region.
Figure 4:
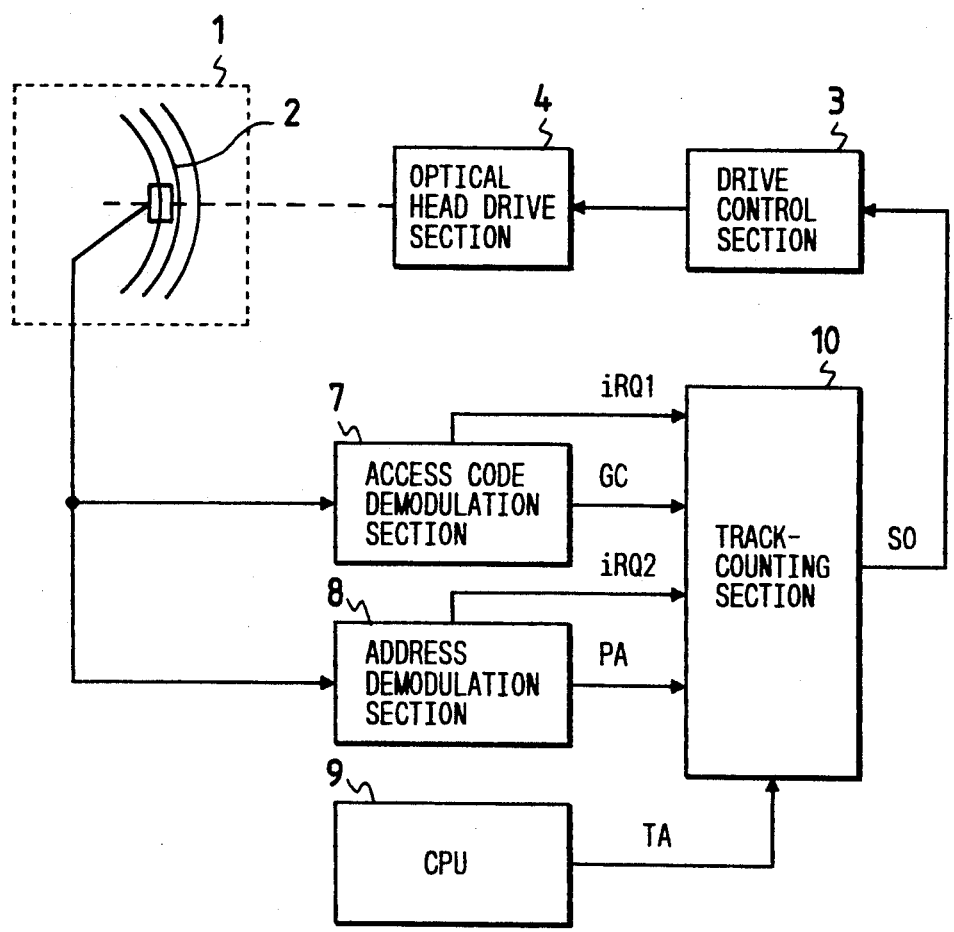
FIG. 4 is a block diagram showing an arrangement of a track-counting system for describing an embodiment of the present invention.

Referring now to FIG. 4, there is schematically illustrated an arrangement of a track-counting system according an embodiment of the present invention. In FIG. 4, illustrated at numeral 1 is an optical disk having thereon a number of tracks and illustrated at numeral 2 is an optical head for tracing the tracks to read out data recorded on the tracks. The optical head 2 is driven through an optical head drive section 4 operable in accordance with a command from a drive control section 3. When the optical head 2 detects an access code as indicated in FIG. 3, an access code demodulation section 7 outputs an interrupt signal IRQ1 and an access code number GC. Further, when the optical head 2 reads out an address, an address demodulation section 8 outputs an interrupt signal IRQ2 and an address PA. Still further, a central processing unit (CPU) 9 is arranged so as to output a target address TA. A track counting section 10 calculates the number of the tracks to be traversed on the basis of the target address TA from the CPU 9 and the current position of the optical head 2 so as to output a movement command to the drive control section 3 and, in addition, calculates the number of the tracks to be further moved whenever the interrupt signal IRQ1 and the access code number GC are inputted thereto to give a command corresponding to the calculation result to the drive control section 3. On the other hand, in response to the inputs of the interrupt signal IRQ2 and the address PA, the track-counting section 10 calculates the position of the optical head 2 on the basis of the address PA so as to calculate the remaining moving amount to give a command corresponding to the calculation result.

Figure 5:
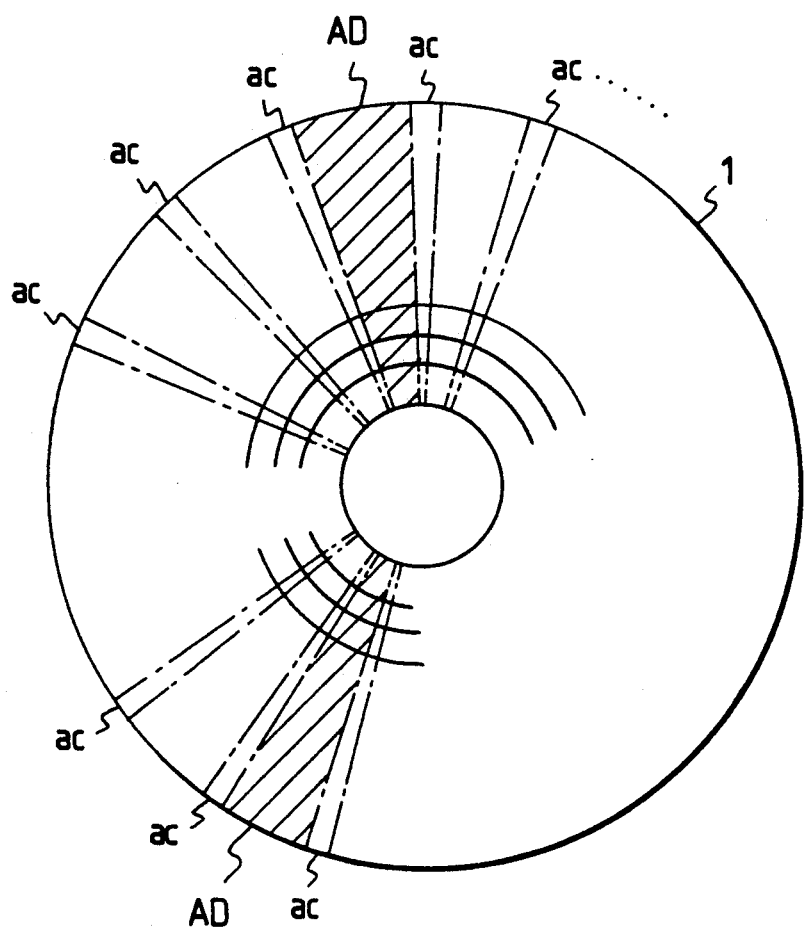
FIG. 5 shows address regions and access code regions on an optical disk.

FIG. 5 shows the positions of the access code regions ac on the optical disk 1 and the positions of the address regions AD thereon. On the optical disk 1 there are provided 22 sectors each comprising 1 address region and 75 data regions, and at the head portion of each region there is provided the access code region. That is, on 1 track there are provided 22 address regions and 1672 access code regions. Each of the access code regions has the pit arrangement as illustrated in FIG. 3.

Figure 6A:
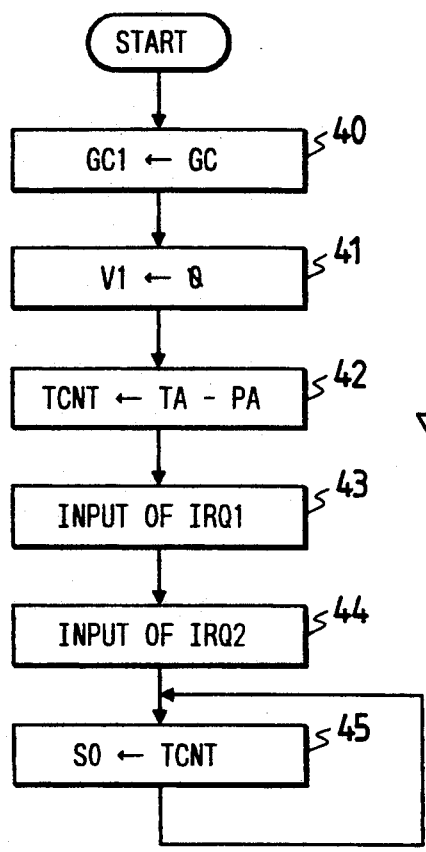
FIGS. 6A to 6E are flow charts for describing the track-counting operation according to this embodiment.

The operation of the track-counting system according to this embodiment will be described hereinbelow with reference to FIGS. 6A to 6E. In FIG. 6A, this operation starts with a step 40 to set the access code number GC to the previous access code number GC1 sampled one time before, then followed by a step 41 to take V0 as the access code difference between the present access code number and the previous access code number and take V1 as the previous access code number difference to set the previous access code number V1 to 0. A step 42 follows to take the difference between the target address TA outputted from the CPU 9 and the address PA read out through the optical head 2 so as to calculate the number of the tracks to be traversed and then set as a count value TCNT a value obtained by adding the negative sign to the calculation value. Since the count value TCNT is a negative value, the counting operation is effected so that the count value TCNT becomes 0 when the optical head 2 traverses the tracks whose number is represented by the count value TCNT. When in a step 43 the interrupt signal IRQ1 is inputted from the access code demodulation section 7, the operational flow jumps to a step 46 in FIG. 6B, and when in a step 44 the interrupt signal IRQ2 is inputted from the address demodulation section 8, the operational flow jumps to a step 56 in FIG. 6E, the steps 46 and 56 will be described hereinafter. A step 45 is provided in order to display the track count value SO representing the number of the remaining tracks to be further traversed.

Figure 6B:
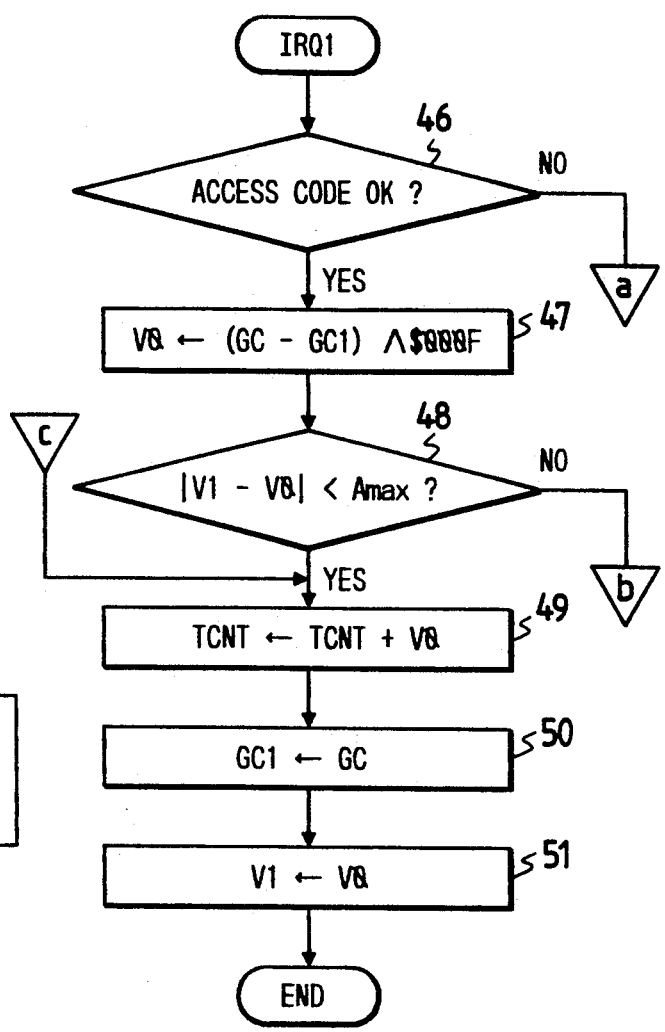

FIG. 6B illustrates the operation to be executed when the interrupt signal IRQ1 is inputted from the access code demodulation section 7. The step 46 is executed in order to check whether the access code number (0 to 15) from the access code demodulation section 7 is correctly read out. If so, a step 47 follows to obtain the difference between the currently read access code number GC and the previously read access code number GC1 so as to take the logical product (AND) of the obtained difference and 000F. This is for accurately obtaining the difference therebetween, for example, in the case that the previous access code number GC1 is 15 and the present access code number is 2, i.e., in the case of jumping-over to the distant track. That is, GC=2=00000010 and −GC1=−15=11110001 result in 2+(−15)=11110011. The logical product of this value and 000F becomes 00000011=3 which is a correct access code number difference. This access code number difference is set to V0. In a subsequent step 48, the absolute value of the access code number difference variation V1−V0 which is the difference with respect to the previous access code number difference V1 obtained in the step 41 is compared with a value Amax which is a value to be determined on the basis of the mechanism of the optical head drive section 4 and which is a maximum value to be taken. Thus, if it exceeds this value Amax, the decision is made such that an abnormality occurs. If it is below the value Amax, a step 49 follows to add the present access code number difference V0 to the count value TCNT (actually, the subtraction therebetween because the count value TCNT is a negative value and the number difference V0 is a positive value) so as to update the count value TCNT. Further, the access number GC is updated in a step 50 and the access code number difference V0 is updated in the next step 51.

Figure 6C:
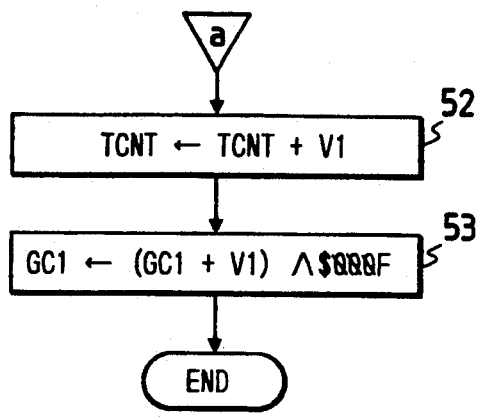
Figure 6D:
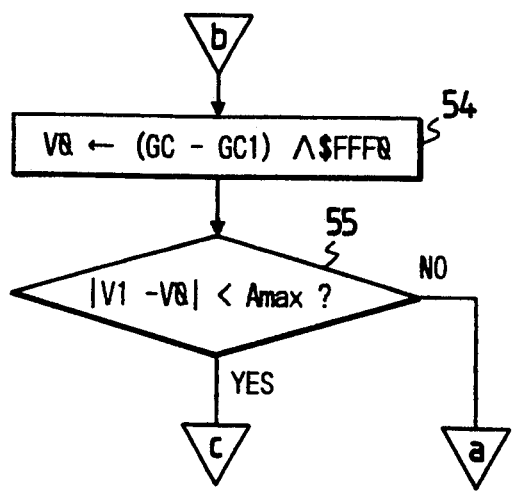

On the other hand, if in the step 46 the reading-out of the access code is abnormal, the operational flow goes to a step 52 in FIG. 6C in order to update the count value TCNT using the previous access code number difference V1 and then advance to a step 53 to similarly update the access code number GC1 using the previous access code number difference V1. Taking the logical product with 000F is for correction in the case of jumping from the unit to the different unit. If in the step 48 of FIG. 6B the absolute value of the access code number difference variation exceeds the value Amax, the operational flow goes to a step 54 in FIG. 6D in order to decide that the optical head 2 has moved in the direction opposite to the counting direction due to eccentricity of the optical disk 1 at the time of the setting (or that the tracks have moved in the direction opposite to the counting direction due to the eccentricity with respect to the optical head 2. In this case, the operation is executed so as to take the logical sum (OR) of the access code number difference GC-GC1 and FFF0 to calculate the moving amount to the opposite direction. For example, in the case of GC=15 and GC1=1, it becomes GC−GC1=14 which exceeds the value Amax. It is considered that this is because of the opposite-direction movement from GC=1 to GC=15 in the case of the track numbers 14, 15, 0, 1. In this case, the logical sum 11111110 of 15−1=14=00001110 and 11110000 represents −2 and further indicates the movement in the opposite direction. In a step 55, under the consideration, the absolute value of the access code number difference variation obtained is again compared with the value Amax. If smaller than the value Amax, under the decision that the opposite-direction movement actually occurs, the operational flow returns to the step 49 in FIG. 6B to add the access code number difference V0 to the count value TCNT. On the other hand, if exceeding the value Amax in the aforementioned step 55, under the decision that the abnormality occurs, the operational flow goes to the step 52 in FIG. 6C to perform the calculation using the previous access code number difference V1.

Figure 6E:
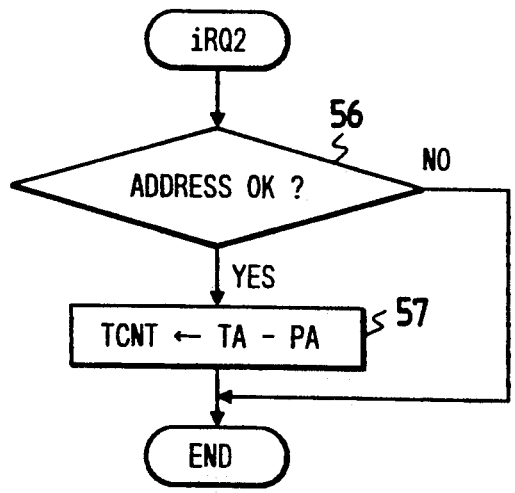

In the case that the interrupt signal IRQ2 is generated in the step 44 of FIG. 6A, the operational flow goes to a step 56 in FIG. 6E in order to check whether the address is correctly read out. If so, a step 57 follows to take the difference between the target address TA and the currently read address PA s as to obtain the number of the remaining tracks. If the answer of the step 56 is negative, the operational flow directly returns to the step 45 in FIG. 6A.

In the above-described operation, when the address of the address segment can be read (decoded) during the track-counting operation, the calculation is effected by preferentially using the read address to count the number of the tracks on the basis of the calculation result.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention. For example, although in this embodiment the previous value is used in the case of the occurrence of abnormality or incorrect reading of the access code number, it is appropriate to use an adequate estimation value.

What is claimed is:

1. A method of counting the number of tracks on a disk each track comprising a plurality of sectors each having an address segment and a plurality of data segments, each of the segments having at its head portion a region for recording an access code representing a track number to which the segment belongs, said method comprising the steps of: establishing a track count value (TCNT) representing the number of tracks to be traversed; sampling an access code number; obtaining a code number difference (V0) between the present sampled access code number (GC) and a previous sampled access code number (GC1); calculating the absolute value of a variation of the present code number difference (V0) with respect to a previous code number difference (V1); comparing the absolute value of the variation with the predetermined value (AMAX); and adding the present code number difference (V0) to the track count value (TCNT) when the absolute value of the variation is below the predetermined value (AMAX) and adding the previous code number difference (V1) to the track count value (TCNT) when the absolute value thereof exceeds the predetermined value (Amax) to thereby obtain the number of the tracks that said recording-reproducing head moves to traverse.

2. A method as claimed in claim 1, further comprising the step of, in the case that difficulty is encountered in reading out a present access code number (GC) to be sampled, adding the previous code number difference (V1) to the track count value (TCNT) to obtain the number of the tracks that said recording/reproducing head moves to traverse.

3. A method as claimed in claim 1, wherein said tracks on said disk are grouped into a plurality of units each comprising a predetermined number of tracks and the tracks of the units relatively corresponding to each other have the same track number.

4. A method as claimed in claim 1, wherein the track count value is arranged to take a negative value so that the number of the tracks that said head moves is converged to 0.

5. A method as claimed in claim 1, further comprising the step of, when said address segment is read during the track counting operation, setting the count number to a count number calculated on the basis of the address of the read address segment.

6. A method of counting the number of tracks on a disk each track comprising a plurality of sectors each having an address segment and a plurality of data segments, each of the segments having at its head portion a region for recording an access code representing a track number to which the segment belongs, said method comprising the steps of: establishing a track count value (TCNT) representing the number of tracks to be traversed; sampling an access code number; obtaining a code number difference (V0) between the present sampled access code number (GC) and a previous sampled access code number (GC1); calculating the absolute value of a variation of the present code number difference (V0) with respect to a previous code number difference (V1); comparing the absolute value of the variation with a predetermined value (AMAX); adding the present code number difference (V0) to the track count value (TCNT) when the absolute value of the variation is below the predetermined value (Amax); and, when the absolute value of the variation exceeds the predetermined value (Amax), deciding that the track numbers are detected in a direction opposite to the direction to be counted so as to calculate the absolute value of a variation of the access code number difference in the opposite direction to obtain the number of the tracks, that said head traverses, on the basis of the calculated absolute value.

7. A method as claimed in claim 6, wherein said tracks on said disk are grouped into a plurality of units each comprising a predetermined number of tracks and the tracks of the units relatively corresponding to each other have the same track number.

8. A method as claimed in claim 6, wherein the track count value is arranged to take a negative value so that the number of the tracks that said head moves is converged to 0.

9. A method as claimed in claim 6, further comprising the step of, when said address segment is read during the track counting operation, setting the count number to a count number calculated on the basis of the address of the read address segment.

10. A method as claimed in claim 6, further comprising the step of, in the case that difficulty is encountered in reading out a present access code number (GC) to be sampled, adding the previous code number difference (V1) to the track count value (TCNT) to obtain the number of the tracks that said recording/reproducing head moves to traverse.

11. A method as recited in claim 1, wherein said step of establishing a track count value (TCNT) representing the number of tracks to be traversed comprises obtaining a difference between a target address (TA) and a current address (PA) to provide said track count value (TCNT).

12. A method as recited in claim 6, wherein said step of establishing a track count value (TCNT) representing the number of tracks to be traversed comprises obtaining a difference between a target address (TA) and a current address (PA) to provide said track count value (TCNT).

* * * * *